United States Patent [19]

Rainey et al.

[11] 3,906,636

[45] Sept. 23, 1975

[54] ENDODONTIC DEVICE

[76] Inventors: William A. Rainey, 5006 Cliffwood Rd.; Donald E. Culberson, 8401 Brownsboro Rd., both of Louisville, Ky. 40222

[22] Filed: Aug. 16, 1973

[21] Appl. No.: 388,997

[52] U.S. Cl. .............................. 32/57; 32/27; 32/58
[51] Int. Cl.² ............................................. A61C 5/02
[58] Field of Search ...................... 32/58, 57, 26, 27

[56] References Cited
UNITED STATES PATENTS

| | | | |
|---|---|---|---|
| 1,035,239 | 8/1912 | Rosenthal | 32/57 X |
| 1,356,755 | 10/1920 | Bolls | 32/57 |
| 1,366,877 | 1/1921 | Craig | 32/57 X |
| 1,499,970 | 7/1924 | Bush | 32/57 X |
| 3,330,040 | 7/1967 | Kahn | 32/57 |
| 3,578,745 | 5/1971 | Garnier | 32/57 |
| 3,590,232 | 6/1971 | Sadowski | 32/27 |
| 3,731,385 | 5/1973 | Farber et al. | 32/27 |
| 3,747,216 | 7/1973 | Bassi et al. | 32/57 |

FOREIGN PATENTS OR APPLICATIONS

| | | | |
|---|---|---|---|
| 450,869 | 10/1927 | Germany | 32/57 |
| 450,868 | 10/1927 | Germany | 32/57 |

*Primary Examiner*—Louis G. Mancene
*Assistant Examiner*—J. Q. Lever
*Attorney, Agent, or Firm*—Harry B. O'Donnell, III

[57] ABSTRACT

This invention provides an endodontic device for removing material within and contiguous to a tooth root canal. Basically, the device comprises rotary drill means for drilling away this material. Preferably, the rotary drill means comprises a flexible member which is generally conformable to the central axis of the tooth root canal and is motor powered for continuous rotation and the material removed by the rotary means comprises pulpal and surrounding dentin material.

12 Claims, 7 Drawing Figures

US Patent   Sept. 23, 1975   3,906,636
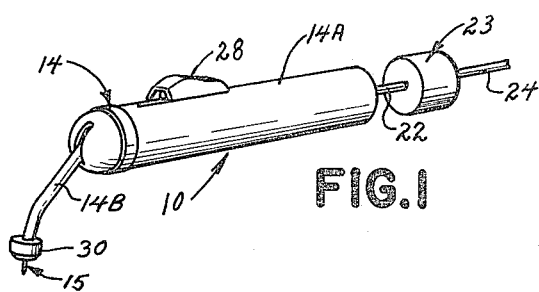
FIG.1
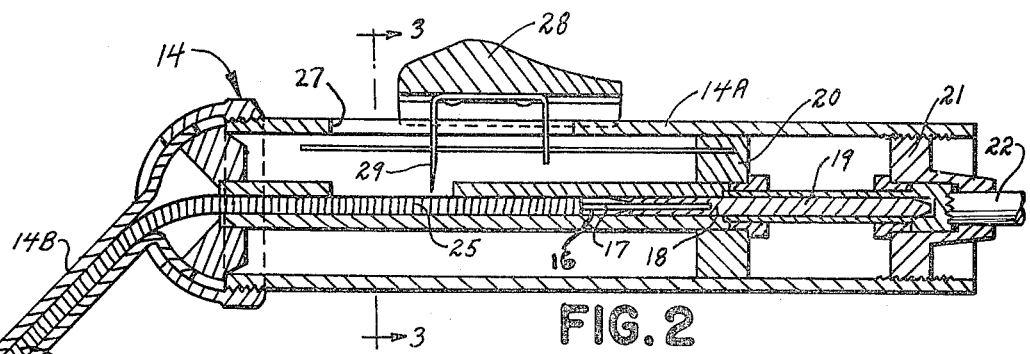
FIG.2
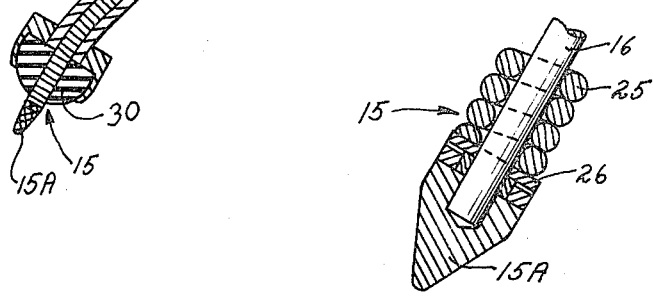
FIG.4       FIG.3
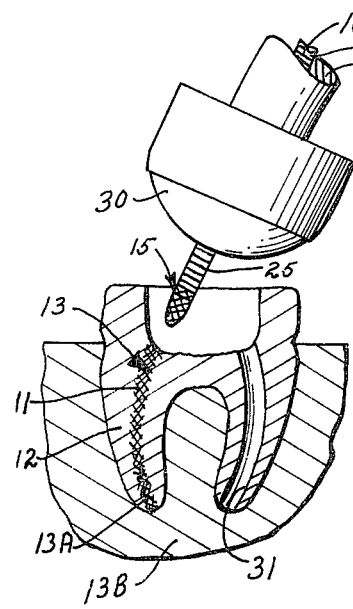
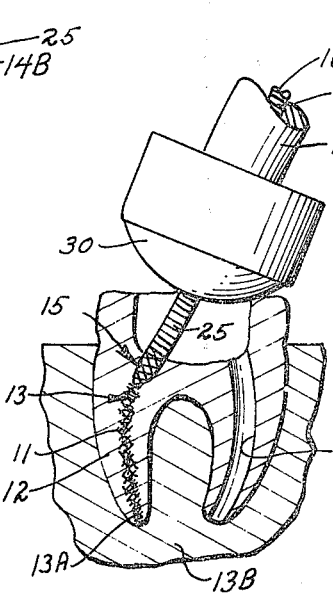
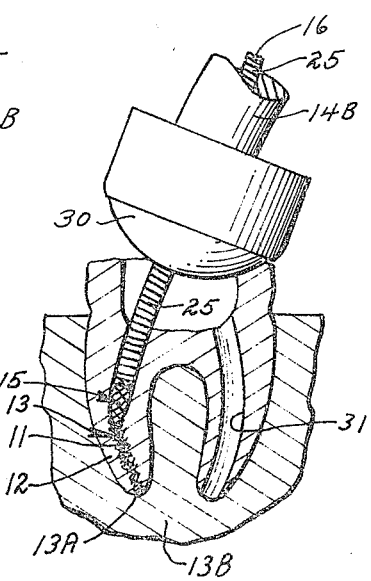
FIG.5       FIG.6       FIG.7

ENDODONTIC DEVICE

BACKGROUND OF THE INVENTION

This invention relates to dental devices and, more particularly, to endodontic devices for treatment of tooth root canals.

Historically, the removal of corrupted material from a tooth root canal has involved a slow, difficult and tedious task, hazardous to the patient and usually requiring the services of a highly trained, special dental person, known as an "endodontist" and has been quite costly. Furthermore, incomplete removal of the corrupted material has led to delayed re-infection of the patient.

The prior-art devices which have been utilized for this purpose have, heretofore, usually been manually-powered and have removed only the pulpal material contained within the tooth root canal. These prior-art devices have been commonly known as tooth root canal "reamers," "files" or "broaches," and typical forms have been described in detail in U.S. Pat. Nos. 3,562,913; 3,578,745; and 3,703,767. It has also been a problem with these prior-art devices to determine when or whether the "reamer" has penetrated the apex of the tooth root and has entered the less dense trabeculated bone area beyond the root apex. In the past, this determination has required the use of either x-rays or, occasionally, yet another device, a "depth gauge", typical forms of which have been described in detail in U.S. Pat. Nos. 3,330,040 and 3,388,473.

The present invention is directed toward the provision of a novel endodontic device which eliminates or greatly mitigates the aforenoted problems and which can be utilized with ease and alacrity by a dental person who is not necessarily a specially trained "endodontist."

SUMMARY OF THE INVENTION

The present invention provides an endodontic device for removing material within and contiguous to a tooth root canal. Basically, the device of the present invention comprises rotary drill means for drilling away this material. Preferably, the rotary drill means comprises a flexible member which is generally conformable to the central axis of the tooth root canal and is motor powered for continuous rotation and the material removed by the rotary means comprises pulpal and surrounding dentin material. It is further desirable that the flexible member of the rotary means have a tip having an outside diameter that is larger than the maximum inside diameter of the tooth root canal.

BRIEF DESCRIPTION OF THE DRAWING

The present invention is illustrated in the accompanying drawing, wherein:

FIG. 1 is a somewhat schematic fragmentary perspective view of a presently preferred form of an endodontic device that is provided in accordance with the present invention and including its motor powered drive means;

FIG. 2 is an enlarged longitudinal cross-sectional view of the device of FIG. 1 without showing its motor powered drive means;

FIG. 3 is a sectional view taken along line 3—3 of FIG. 2;

FIG. 4 is a greatly enlarged fragmentary longitudinal cross-sectional view of the tip portion of the flexible member of the rotary means of the device shown in FIGS. 1 and 2;

FIG. 5 is a greatly enlarged diagrammatic cross-sectional view of a tooth, a molar having two root canals, on which the device of the present invention can be employed and shows the tooth in a condition following completion of the use of the device on one of the two root canals and just prior to the beginning of the use of the device on a second of the root canals;

FIG. 6 is a view similar to that of FIG. 5, but showing the tooth as the tip of the flexible rotary member of the device commences entry into the second root canal; and FIG. 7 is another view similar to that of FIGS. 5 and 6, but showing the tooth as the tip of the flexible rotary member of the device generally conforms to the central axis of the second root canal and approaches the apex of the second root.

DETAILED DESCRIPTION

Turning now to the drawing and, more particularly to FIGS. 1–4 thereof, there is illustrated a presently preferred form of a novel endodontic device 10 that is provided in accordance with the present invention for removing corrupted pulpal material 11 from within and dentin material 12 contiguous to a tooth root canal 13, as shown in detail in drawing FIGS. 5–7.

As shown, the device 10 comprises a hollow, generally tubular, casing 14 which normally (FIGS. 1 and 2) encloses all but the tip portion 15 of a flexible member 16 that is generally conformable to the central axis of the tooth root canal 13. The flexible member 16 has an end 17 opposite from its tip portion 15 which is slidably connected for limited longitudinal movement to a splined end 18 of a collet 19 that is rotatably journalled in bearings 20 and 21 contained within the hollow casing 14. This collet 19 is in turn, connected by a generally rigid rotary shaft 22 to motor powered rotary drive means 23 located externally of the casing 14. While not shown in detail, it should be understood that these drive means 23 could be driven by various power forms, e.g. pressurized fluids or electricity, and connected to the power source (not shown) by a flexible conduit 24.

As further shown, the flexible member 16 is surrounded by a coiled springlike member 25, similar to that found in remote controls for automobile chokes and the like, which is extended longitudinally between a shoulder 26 provided on the tip portion 15 of the flexible member 16 and the splined end 18 of the collet 19. The casing 14 is provided with a slot 27 in which there is mounted for slidable movement a push-button type of trigger 28, similar to that commonly found in flashlight switches. This trigger 28 carries a prong 29 which can be engaged between the coils of the coiled member 25, such that movement of the trigger 28, as by the thumb of an operator, along the long axis of the casing 14 and rotary flexible member 16 toward the tip portion 15 of the flexible member 16 will cause the tip portion 15 of the flexible member 16 to be further extended from the casing 14 (FIGS. 5–7). Conversely, movement of this trigger 28 in the opposite direction along the long axis of the casing 18 will result in retraction of the tip portion 15 of the flexible member 16.

Preferably, as best shown in FIGS. 1 and 2, the casing 14 is divided into two angularly offset and relatively movable sections 14A and 14B, with a first of these casing sections 14A housing the collet 19, bearings 20 and 21, and trigger 28, while the second casing section 14B contains the portion of the rotary flexible member 16 adjacent its tip portion 15. Also, the end of the second casing section 14B is preferably provided immediately adjacent the tip 15A of the flexible member tip portion 15 with a perforated resilient cushion 30 (FIGS. 1 and 2), made of an elastomeric compound or the like, which can be rested against the upper surface of the tooth (FIGS. 6 and 7).

As further shown in FIGS. 1–2 and 4–7 the tip 15A of the rotary flexible member 16 is tapered and has a maximum outside diameter which is slightly greater than the maximum inside diameter of the tooth root canal 13. While various materials of construction could be utilized for the tapered tip 15A of the tip portion 15 of the rotary flexible member 16, good results have been obtained by using either tungsten carbide or diamond materials.

In operation, the rotary drive means 23 is first energized by connecting it to its power source (not shown) via its flexible conduit 24. This causes rotation of the generally rigid shaft 22 and, in turn, of the collet 19 and the flexible member 16 and its tip portion 15. The rotating tip portion 15 is then partly extended from the casing cushion 30 (FIG. 5) through operation of the trigger 28 and initially entered into the tooth root canal 13 (FIG. 6). Once the tip portion 15 of the rotating flexible member 16 has entered the root canal 13, it will take the line of least resistance and generally conform to the central axis of the root canal 13, removing both the softer pulpal material 11 from within the tooth root canal 13 while also removing some of the harder dentin material 12 contiguous to the tooth root canal 13.

As the tip portion 15 of the rotating flexible member 16 is further advanced into the root canal 13 by further movement of the trigger 28, the cushion 30 may be rested on the top of the tooth (FIGS. 6 and 7). The operator continues to advance the tip portion 15 of the rotating flexible member 16 into the tooth root canal 13 until a decreased resistance is sensed by his thumb or "trigger finger," thus indicating that the tip portion 15 of the rotating flexible member 16 has then drilled away all of the softer pulpal material 11 and a portion of the contiguous harder dentin material 12 of the root canal 13 and has broken through to the less dense trabeculated bone area 13B beyond the root apex 13A, The tip portion 15 of the rotating flexible member 16 is now immediately retracted and removed from the tooth by reversing the sliding movement of the trigger 28. This leaves a drilled bore 31 (FIGS. 5–7) wherein all of the pulpal material 11 has been drilled away along with a portion of the dentin material 12 contiguous to the root canal 13.

It should be apparent that while there has been described what is presently considered to be a preferred embodiment of the present invention in accordance with the Patent Statutes, changes may be made in the disclosed device without departing from the true spirit and scope of this invention. It is, therefore intended that the appended claims shall cover such modifications and applications that may not depart from the true spirit and scope of the present invention.

We claim:
1. An endodontic device for removing material within and contiguous to a tooth root canal comprising:
   a. rotary means for drilling away material within and contiguous to a tooth root canal,
   b. said rotary means comprising a member including a flexible portion,
   c. said flexible portion being receivable within said tooth root canal to flex therein and generally conform therein to the central axis of said tooth root canal, and
   d. said flexible portion of said member having on its distal end a self-guiding rigid drill tip for drilling away both material within and contiguous to said tooth root canal.

2. The invention of claim 1, wherein said rotary means is motor powered for continuous rotation.

3. The invention of claim 2, wherein said rotary means comprises means for drilling away pulpal and surrounding dentin material.

4. The invention of claim 3, wherein said drilling away of both material within and contiguous to said tooth root canal by said rigid drill tip on said distal end of said flexible portion of said member extends to the apex of the tooth root.

5. The invention of claim 4, wherein said rigid drill tip on said distal end of said flexible portion of said member has an outside diameter that is larger than the maximum inside diameter of said root canal.

6. The invention of claim 5, wherein said rigid drill tip on said distal end of said flexible portion of said member comprises tungsten carbide.

7. The invention of claim 5, wherein said rigid drill tip on said distal end of said flexible portion of said member comprises diamond material.

8. The invention of claim 1, wherein said rotary means comprises means for drilling away pulpal and surrounding dentin material.

9. The invention of claim 1, wherein said drilling away of both material within and contiguous to said tooth root canal by said rigid drill tip on said distal end of said flexible portion of said member extends to the apex of the tooth root.

10. The invention of claim 1, wherein said rigid drill tip on said distal end of said flexible portion of said member has an outside diameter that is larger than the maximum inside diameter of said root canal.

11. The invention of claim 10, wherein said rigid drill tip on said distal end of said flexible portion of said member comprises tungsten carbide.

12. The invention of claim 10, wherein said rigid drill tip on said distal end of said flexible portion of said member comprises diamond material.

* * * * *